R. FEIX.
MOLD FOR MAKING GLASS LENSES.
APPLICATION FILED MAY 21, 1913.
1,177,177.
Patented Mar. 28, 1916.
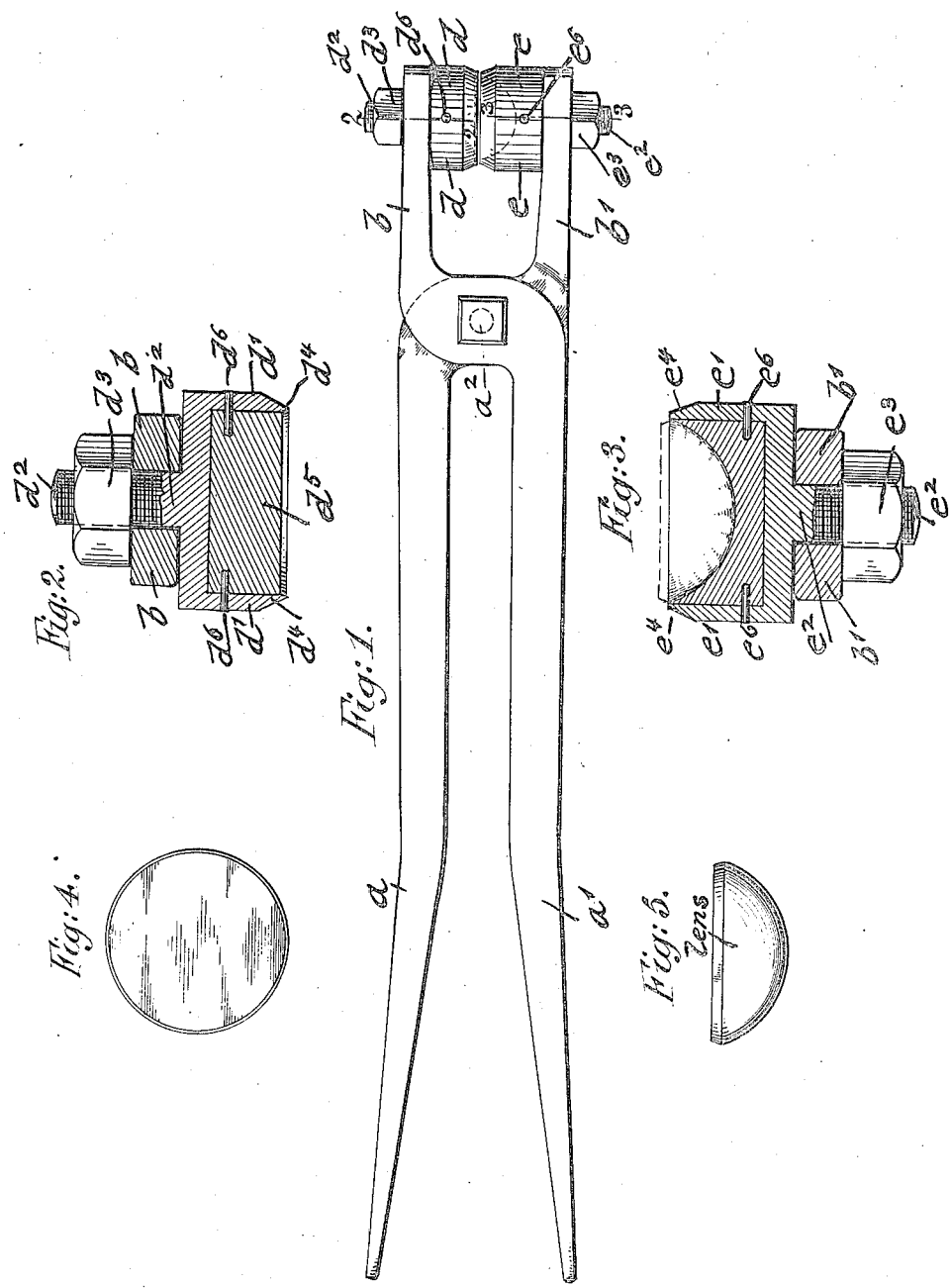

UNITED STATES PATENT OFFICE.

RICHARD FEIX, OF EVERGREEN, NEW YORK.

MOLD FOR MAKING GLASS LENSES.

1,177,177. Specification of Letters Patent. Patented Mar. 28, 1916.

Application filed May 21, 1913. Serial No. 768,910.

*To all whom it may concern:*

Be it known that I, RICHARD FEIX, a citizen of the United States of America, residing in Evergreen, in the county of Queens and State of New York, have invented certain new and useful Improvements in Molds for Making Glass Lenses, of which the following is a specification.

This invention relates to an improved mold for making glass lenses for electric pocket-lamps, automobile-lamps and other articles of smaller or larger sizes. Heretofore these lenses could not be made in an entirely finished shape and condition in the molds, for the reason that their flat sides came out in rough state from the mold and had to be ground and polished into final shape for use. This added a considerable expense to the price of the lenses and prevented the manufacture of lenses of this kind in this country.

The object of this invention is to supply a mold by which glass lenses can be made completely finished directly in the mold, without any labor for grinding and polishing the flat portion of the same; and for this purpose the invention consists of a mold having a tong-shaped frame, to the jaws of which are attached cups having tapering cutting edges, one cup being provided with a filling of polished nickel having a concave recess, while the other cup is provided with a cylindrical block of nickel having a polished face, both blocks being attached by means of pins or rivets to their respective cups.

In the accompanying drawing, Figure 1 represents a side-elevation of my improved mold for making glass lenses, Figs. 2 and 3 are vertical central sections of the two mold-sections required for making the lenses, respectively on lines 2—2 and 3—3, Fig. 1, and Figs. 4 and 5 are respectively a rear-view and a top-view of a glass lens made by my improved mold.

Similar letters of reference indicate corresponding parts throughout the different figures of the drawing.

Referring to the drawing, $a$ and $a^1$ represent the handles of the tong-shaped frame of my improved mold for making glass lenses. The handles are fulcrumed to each other at $a^2$ and provided with forwardly-extending jaws $b$ and $b^1$, which are parallel with each other when the mold is closed, for pressing and cutting off the lens from the heated glass rod fed to the same. To the inner face of the jaw $b$ is attached a mold-section $d$, and to the face of the jaw $b^1$ a mold-section $e$, which mold-sections are made of cylindrical shape and of a size corresponding to the size of lens to be made by the mold. Each mold-section is formed of a steel cup $d^1$, $e^1$, respectively, which is provided with a central threaded shank $d^2$ or $e^2$ which is passed through a hole in its jaw and attached to the same by means of a screw-nut $d^3$ or $e^3$ that is tightly screwed over the threaded shank of the cup. The cups $d^1$ and $e^1$ are made of steel and provided with tapering circumferential edges $d^4$, $e^4$ having a small angle to the side of the cup, and the direction of movement of the cup when the tongs are actuated. This angle is nearly zero degrees. In the cup $d^1$ is seated a cylindrical block $d^5$ of nickel, which is retained in the cup by means of pins or rivets $d^6$ which are driven through the side-wall of the cup into the filling block, as shown clearly in Fig. 2. The face of the nickel block $d^5$ is highly polished and set slightly back from the sharp edge of the cup, as shown in Fig. 2. The mold-section $e$ is constructed in the same manner as the mold-section $d$, and composed of a steel cup $e^1$ having a tapering cutting edge $e^4$, a screw-threaded shank $e^2$ and a clamping nut $e^3$ for attaching the same to the jaw $b^1$ of the tong-shaped frame, but with the difference that, in place of a block of cylindrical shape, a cylindrical block of nickel having a concavity corresponding to the convexity of the lens is inserted and riveted into the steel cup of the mold-section, as shown in Fig. 3.

For making the lenses, the mold, which is heated up by a gas or other flame, clips off from a soft glass bar of the required size a quantity sufficient for making the lens and filling the interior of the mold-section $e$. After the lens is formed in the mold and cooled, to a certain extent, it is dropped from the mold and placed into a closed cooling receptacle. After it is cooled off, the small irregular chips are trimmed off from the circumference of the lens, upon which the lens is immediately ready for use without requiring any polishing of the straight face of the same. Owing to the highly polished straight and concave faces of the filling blocks of the mold-sections, the lens is pressed directly into completely finished shape, so that it is immediately ready for use without requiring any further manipulation.

I claim:

In a mold for making glass lenses, a pair of mold sections, each composed of exterior steel cups, each provided with outwardly extending shanks, and each having matching circumferential edges and each having a nickeled filling block within each steel cup arranged inwardly of said edges and provided with a highly polished face surface of a shape to conform to the shape of the material to be molded.

In testimony, that I claim the foregoing as my invention, I have signed my name in presence of two subscribing witnesses.

RICHARD FEIX.

Witnesses:
PAUL GOEPEL,
JOHN MURTAGH.